United States Patent Office 3,342,853
Patented Sept. 19, 1967

3,342,853
METHOD FOR THE PREPARATION OF ACRYLATE DIMERS AND TRIMERS
Joseph W. Nemec, Rydal, and Richard B. Wuchter, Jenkintown, Pa., assignors to Rohm & Haas Company, Philadelphia, Pa., a corporation of Delaware
No Drawing. Filed July 10, 1964, Ser. No. 381,923
11 Claims. (Cl. 260—485)

This invention deals with a method for the preparation of dimers and trimers of acrylates having the formula $$CH_2=CHCOOR$$

in which R represents alkyl of 1 to 18 carbon atoms, preferably alkyl of 1 to 4 carbon atoms. It further deals with the trimer as a new composition of matter.

The prior art methods for preparing dimers of acrylates employ alkoxides, amides, phosphines and other agents with varying degrees of success. These known methods are complicated by the production of mixtures or the need for expensive agents. In contrast, the process of this invention gives both high yields of the desired product and employs a relatively inexpensive catalytic agent.

The products obtained by the present process may be represented by the formulas

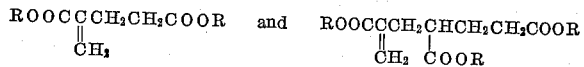

where R has the significance given heretofore.

R may typically represent methyl, ethyl, propyl, butyl, hexyl, octyl, decyl, dodecyl, tetradecyl and octadecyl, in any of the known spatial structures, such as normal, iso- and tertiary. Typical acrylate reactants include methyl acrylate, ethyl acrylate, isopropyl acrylate, butyl acrylate, 2-ethylhexyl acrylate, t-dodecyl acrylate and octadecyl acrylate.

The process of the present invention employs a catalyst defined by the formula $$(R_1R_2N)_3P$$

wherein $R_1$ and $R_2$ can be the same or different.

$R_1$ and $R_2$ represent alkyl groups of 1 to 18 carbon atoms joined to the nitrogen atom at a primary carbon. It is preferred that these groups contain from 1 to 4 carbon atoms.

$R_1$ and $R_2$, collectively with the nitrogen atom to which they are attached, may form a saturated cyclic amine group containing up to 5 carbon atoms in the ring, optionally containing 1 or more alkylsubstituents having a total of up to 6 carbon atoms. This cyclic amine group may contain an oxygen atom or a sulfur atom, if desired.

$R_1$ and $R_2$, as alkyl embodiments, may possess inert substituents as long as the carbon atom attached to the nitrogen is primary in structure. Such inert substituents include cyano, chloro, bromo, alkoxy or carbalkoxy moieties, among others. These are within the gamut of this invention. Neither $R_1$ nor $R_2$ can be hydrogen or aryl.

Typically, $R_1$ and $R_2$, individually, may be methyl, ethyl, propyl, butyl, pentyl, hexyl, octyl, dodecyl, octadecyl and, collectively with the nitrogen atom, may represent piperidino, morpholino, thiomorpholino, piperazino, pyrrolidinyl and ethylpiperidino.

Specific embodiments of the catalyst typically include hexa-n-propylphosphorus triamide, hexaethylphosphorus triamide, hexa-n-butylphosphorus triamide, dimethyltetra-n-propylphosphorus triamide, tripiperidinophosphorus triamide, hexa-n-octaylphosphorus triamide and hexamethylphosphorus triamide. Preferred embodiments are hexa-n-propylphosphorus triamide and hexa-n-butylphosphorus triamide.

The specific catalyst, as defined above, is employed in the present process in amounts as low as 0.25 mole percent but is preferably used in the range of about 0.7 to 1.5 mole percent. Greater amounts can be employed, if desired, but generally there is no advantage.

The catalyst may be employed as such or prepared in situ, as desired. If preparation in situ is contemplated, one employs phosphorus trichloride and the appropriate amine, as will be understood by those skilled in the art. The in situ preparation involves the formation of an amine salt which must be substantially completely removed, such as by filtration or washing, as desired.

The present process is conducted in the range of about 0° to 100° C., preferably 25° to 85° C. The pressure is not critical and the reaction is generally performed to atmospheric pressure, although subatmospheric and superatmospheric pressures are suitable. If desired, nitrogen or other inert atmosphere may be used, but such is not required.

A solvent is not required in the present process, although it is frequently desirable to employ an inert, volatile, organic solvent. Typically, one may use acetonitrile, hexane, benzene, toluene or the like.

One may conduct the reaction by adding the acrylate to the catalyst or the reverse, as desired. It is preferred to add the acrylate incrementally to the catalyst, with or without a solvent, at a rate substantially consistent with the rate of reaction. The reaction is somewhat exothermic in nature and the incremental addition of the acrylate to the catalyst can be regulated to moderate the heat of the exothermic reaction.

Small amounts of water can be tolerated in the reaction mixture without any noticeable deterrence. However, larger amounts of water, such as 5 to 10% by weight, based on the acrylate, is enough to inhibit considerably the desired process. This should be kept in mind if the amine salt formed from the in situ preparation of the catalyst is washed out of the reaction mixture.

At the conclusion of the reaction, the desired product is separated by distillation techniques. Unreacted material, if any, and solvent, if one is employed, are removed first and then the dimer is next isolated followed finally by the trimer. Usually the dimer is formed in greater amounts than the trimer and typically, the product will be 70 to 80% or more dimer and 10 and 18% trimer. They are readily separated by distillation, as mentioned hereinbefore. The dimer and trimer products are useful monomers and chemical intermediates. The trimer is particularly useful in the production of copolymers, especially with methyl methacrylate and styrene, as well as other comonomers, where the trimer also provides valuable plasticizing properties to the copolymers. Because of the unique structure of the trimer, said trimer may be used to provide cross-linking to such a polymer system to form useful resins for protective coatings for wood, metal and the like. Typically, in this respect, a useful copolymer consists of 40% methyl methacrylate, 40% styrene and 20% of the trimer of this invention, all parts being by weight. These copolymers are effective coatings that are resistant to cracking and have good impact strength. Especially valuable are those copolymers made from the trimer of this invention wherein the symbol R represents ethyl.

By adhering strictly to the aforementioned conditions, one is able to produce consistently and economically high yields of desired product without any appreciable, undesirable side effects.

The present process may be more fully understood from the following examples that are offered by way of illustration and not by way of limitation.

*Example 1*

Ethyl acrylate (400 grams, 4.0 moles) is added dropwise and continuously to a stirred solution of 8.0 grams (24 mmoles) of hexa-n-propylphosphorus triamide dissolved in 50 ml. of toluene at 35° C. The reaction mixture is allowed to stir an additional 3 hours at 35° C. after the addition. On distillation, 25 grams of ethyl acrylate is recovered. Vacuum distillation produces 257 grams of diethyl α-methyleneglutarate, B.P. 82° C. (0.75 millimeters of mercury pressure), $n_D^{25}=1.4375$ and 68 grams of diethyl 2-methylene-4-carbethoxypimelate, B.P. 100° C. (0.10 millimeter of mercury pressure), $n_D^{25}=1.4470$, molecular weight 300±2. Beside characterization by hydrolysis to the corresponding acids, the infrared and nuclear magnetic resonance spectra substantiate the above structures for the dimer and trimer.

*Example 2*

Phosphorus trichloride (6.85 grams, 50 mmoles) is added dropwise and continuously to a stirred solution containing 30.4 grams (0.30 mole) of di-n-propylamine in 100 ml. of hexane at 10° C. After complete addition, the reaction mixture is allowed to stir 1 hour at room temperature. Sufficient water (75 ml.) is then added to dissolve the amine salt and the organic layer is separated. The organic layer is washed once with 75 ml. of water. To this stirred catalyst solution is added dropwise 400 grams (4.0 moles) of ethyl acrylate (contains inhibitor-methyl ether of hydroquinone). The temperature is maintained at 60° to 65° C. during the addition (about 40 minutes) and for 2 hours afterwards. After removal of the volatile materials, the reaction mixture is vacuum distilled to give 312.5 grams of diethyl α-methyleneglutarate and 61 grams of diethyl 2-methylene-4-carbethoxypimelate.

*Example 3*

Phosphorus trichloride (2.61 ml., 30 mmoles) is added dropwise to a stirred solution containing 24.6 ml. (0.18 mole) of di-n-propylamine dissolved in 100 ml. of benzene and immersed in an ice-bath. After complete addition, the reaction flask is allowed to come to room temperature before separation of the precipitated amine salt by suction filtration. An additional 100 ml. of benzene is added to remove all the salt from the flask and to wash the precipitated salt. Ethyl acrylate (300 grams, 3.0 moles) is added dropwise to the stirred filtrate solution maintained at 35° C. The reaction mixture is allowed to remain at 35° C. for a further 3 hours before distillation. There results 200 grams of diethyl α-methyleneglutarate and 42 grams of diethyl 2-methylene-4-carbethoxypimelate.

*Example 4*

Ethyl acrylate (400 grams, 4.0 moles), containing as inhibitor, methyl ether of hydroquinone, is added dropwise to a stirred hexane solution containing hexa-n-propylphosphorus triamide (about 40 mmoles) at 60° to 65° C. The catalyst solution has been prepared, as described in Example 2. The reaction is held at 60° to 65° C. for 2 hours. On distillation, there is obtained 314 grams of diethyl α-methyleneglutarate and 60 grams of diethyl 2-methylene-4-carbethoxypimelate.

Similar results are obtained by using tripiperidinophosphorus triamide as the catalyst.

*Example 5*

Phosphorus trichloride (5.22 ml., 60 mmoles) is added dropwise at ice temperatures to a stirred solution containing diethylamine (26.4 grams, 0.36 mole). The reaction mixture is then allowed to stir at room temperature for 1 hour before addition of 75 ml. of water. After separation of the two layers and one further aqueous wash of the organic layer, the catalyst solution is placed in a reaction flask. Ethyl acrylate (300 grams, 3.0 moles), containing the methyl ether of hydroquinone, is added dropwise to the stirred solution at 35° C. After allowing the reaction to stir for an additional 2 hours at 35° C., the reaction products are separated by vacuum distillation to yield 222 grams of diethyl α-methyleneglutarate and 39 grams of diethyl 2-methylene-4-carbethoxypimelate.

Similar results are obtained by employing hexa-n-octylphosphorus triamide as the catalyst.

*Example 6*

2-ethylhexyl acrylate (150 grams, 0.81 mole), containing the methyl ether of hydroquinone, is added dropwise to 10 mmoles of hexa-n-butylphosphorus triamide dissolved in 75 ml. of hexane maintained at 35° to 40° C. The reaction is permitted to stir an additional 2 hours at 40° C. after the addition. Analysis of the reaction mixture indicates a 77.5% yield of di-2-ethylhexyl α-methyleneglutarate. A sample of this product, B.P. 147° to 150° C. (0.10 millimeters of mercury pressure), $n_D^{25}=1.4515$, is identical to material prepared by transesterification of diethyl α-methyleneglutarate with 2-ethylhexyl alcohol.

Similar results are obtained by using dimethyltetra-n-propylphosphorus triamide as the catalyst.

*Example 7*

Methyl acrylate (344 grams, 4.0 moles), inhibited with the methyl ether of hydroquinone, is added dropwise to a stirred solution maintained at 65° C. containing 13.2 grams (40 mmoles) of hexa-n-propylphosphorus triamide in 100 ml. of hexane. After permitting the reaction to remain at 65° to 70° C. for a further 2 hours, the reaction mixture is distilled to yield 275 grams of dimethyl α-methyleneglutarate, B.P. 65° to 70° C. (0.12 to 0.15 millimeter of mercury pressure), $n_D^{25}=1.4438$ and 52 grams of dimethyl 2-methylene-4-carbomethoxypimelate, B.P. 105° to 110° C. (0.15 millimeters of mercury pressure), $n_D^{25}=1.4540$. Basic hydrolyses of these products followed by acidification with hydrochloric acid provide acids identical to those prepared in Example 1.

Similar results are obtained by employing dodecyl acrylate in place of methyl acrylate.

We claim:
1. A composition of matter having the formula

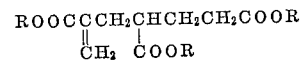

wherein R is alkyl of 1 to 18 carbon atoms.

2. The composition of claim 1 wherein R is alkyl of 1 to 4 carbon atoms.

3. The composition, diethyl 2-methylene-4-carbethoxypimelate.

4. The composition, dimethyl 2 - methylene - 4 - carbomethoxypimelate.

5. The composition, dioctyl 2-methylene-4-carboctoxypimelate.

6. The composition, didodecyl 2-methylene-4-carbododecoxypimelate.

7. A method for the preparation of dimers and trimers of acrylates having the formula

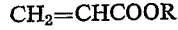

wherein R is alkyl of 1 to 18 carbon atoms, comprising reacting said acrylates in the presence of a catalyst having the formula

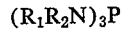

wherein $R_1$ and $R_2$, individually, represent alkyl groups of 1 to 18 carbon atoms, and $R_1$ and $R_2$ being joined to the nitrogen atom on a primary carbon atom.

8. The method according to claim 7 in which said catalyst is used in an amount of at least 0.25 mole percent and the reaction is conducted in the range of about 0° to 100° C.

9. The method according to claim 7 wherein the catalyst is employed in the range of about 0.7 to 1.5 mole percent and the reaction is conducted in the range of about 25° to 85° C.

10. The method according to claim 9 wherein $R_1$ and $R_2$, individually, represent propyl.

11. The method according to claim 9 wherein $R_1$ and $R_2$, individually, represent butyl.

No references cited.

RICHARD K. JACKSON, *Primary Examiner.*

T. L. GALLOWAY, *Assistant Examiner.*